T. W. COOK.
DENTAL FLOSS HOLDER.
APPLICATION FILED JUNE 14, 1918.

1,380,530.

Patented June 7, 1921.

Inventor
Thomas W. Cook.

By Harry C. Schroeder
Attorney

UNITED STATES PATENT OFFICE.

THOMAS W. COOK, OF BERKELEY, CALIFORNIA.

DENTAL-FLOSS HOLDER.

1,380,530.

Specification of Letters Patent.

Patented June 7, 1921.

Application filed June 14, 1918. Serial No. 239,914.

*To all whom it may concern:*

Be it known that I, THOMAS W. COOK, citizen of the United States, residing at Berkeley, in the county of Alameda and State of California, have invented certain new and useful Improvements in Dental-Floss Holders, of which the following is a specification.

This invention is an improved dental floss holder.

The invention is illustrated in the accompanying drawing which forms a part of this specification and the appended claims.

Referring to the drawing.

Figure 1:
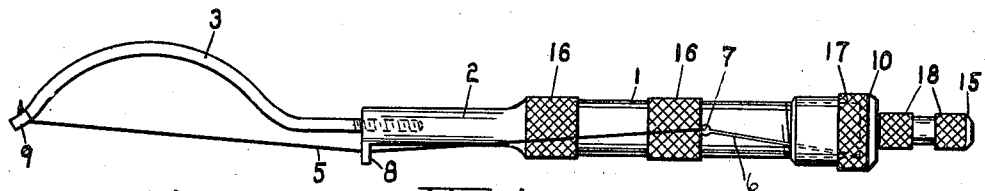
Figure 1 is a side elevation of the holder.
Figure 2:
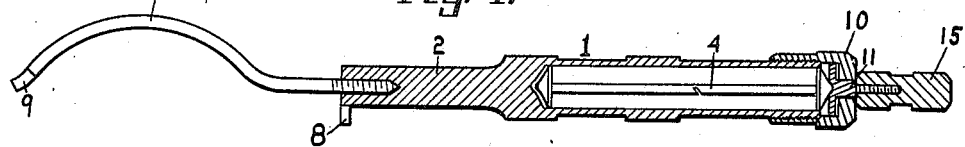
Fig. 2 is a longitudinal section of the holder.
Figure 3:
Fig. 3 is a side view of the spool upon which the floss is wound.
Figure 4:
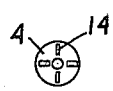
Fig. 4 is an end view of the spool.
Figure 5:
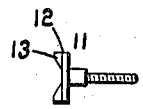
Fig. 5 is a side view of the spool wrench.
Figure 6:
Fig. 6 is an end view of the spool wrench.
Figure 7:
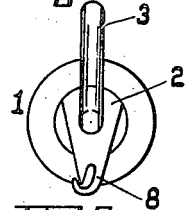
Fig. 7 is a front end view of the holder.
Figure 8:
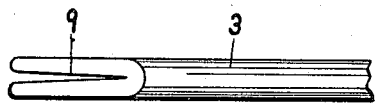
Fig. 8 is a view of the forward portion of the bow.
Figure 9:
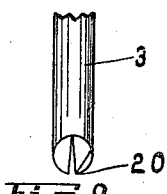
Fig. 9 is an end view of the bow.

In the drawing, 1 indicates a hollow handle in the forward end of which is screwed the rear end of a floss bow 3. A spool 4 fits within the hollow handle which spool is wound with dental floss 5. The handle is provided with a slot 6 extending from its rear end to a hole 7 in the handle, through which slot the floss on the spool is introduced into said hole. A slitted eye 8 depends from the forward end of the handle 1 through which eye the floss 5 is drawn and from said eye the floss is drawn through a fork 9 on the forward end of the bow 3 and a knot tied in the end of the floss to prevent the end of the floss from being drawn through the fork. The floss may be wrapped around the fork to strengthen the connection of the floss to the forward end of the bow. A cap 10 screws on the rear end of the hollow handle 1. A spool wrench 11 is journaled in the head of the cap 10. The wrench has a disk 12 with lugs 13 on it arranged within said cap, which lugs are adapted to engage recesses 14 in the outer end of the floss spool. The wrench has a threaded shank which extends outside of the head of the cap and on which screws a handle 15 by means of which the wrench and the spool 4 are turned to tighten the floss. The wrench is so journaled in the cap head as to provide a little play between the inner end of the handle 15 and the wrench disk 12, which enables the cap to be screwed against the wrench disk to press the lugs 13 against the end of the handle to lock the wrench and spool to hold the floss taut, or to be unscrewed slightly to release the wrench and the spool. The handle 1, cap 10 and wrench handle 15 may be provided respectively with knurled faces 16, 17 and 18 whereby these parts may be gripped. The fork 9 has an inner knife edge 20 for cutting off the surplus end of the floss.

Figure 10:
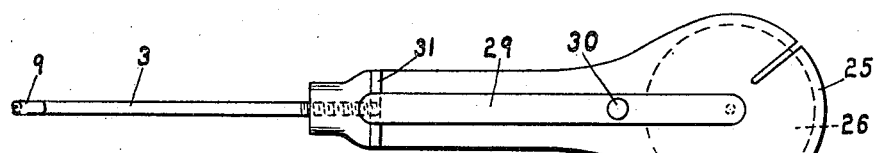
Fig. 10 is a plan view of a modified form of holder.
Figure 11:
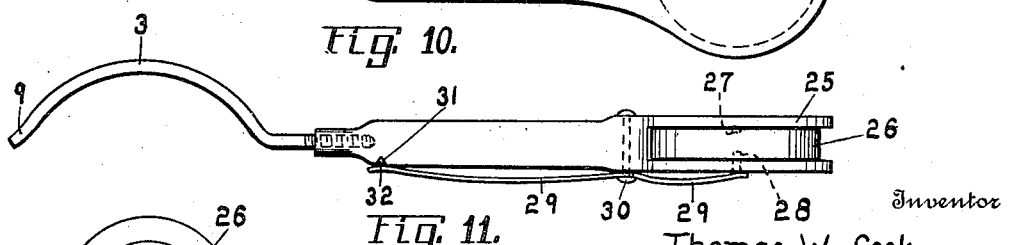
Fig. 11 is a side view of said modified form of holder.
Figure 12:
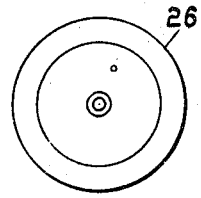
Fig. 12 is an end view of the floss spool used in said modified form of holder.

In the modified form of my invention shown in Figs. 10 to 12 inclusive, the handle is formed with a spring fork 25 at its rear end to receive and hold a commercial floss spool 26. A stationary journal 27 is provided on the inside of one of members of fork 25 and a journal 28 is mounted to move axially in the other fork member opposite journal 27, the journal 28 being secured to the rear end of a flat spring 29 secured to the handle by a rivet 30. Said journals are adapted to fit in bearings in the spool 26 to journal the spool within the fork. The spring 29 normally holds the journal 28 within the spool bearing but allows said journal to be withdrawn outwardly to permit insertion of the spool within the fork or removal of the spool from the fork. The forward end of the handle is provided with a transverse groove 31 to receive a tongue 32 on the forward end of spring 29. One member of the fork 25 is provided with a slot through which the floss extends from the spool 26. The floss is extended and secured to the forward forked end of the bow 3 and is drawn taut across the bow and gripped in the groove 31 by tongue 32 under the action of spring 29.

Having described my invention, what I claim as new and desire to secure by Letters Patent is:

1. A dental floss holder including a handle, a bow on said handle, a spool of dental floss, means for mounting said spool on said handle, means for securing the forward end of said floss across said bow, a cap adapted to screw on the rear end of said handle to hold the spool within the handle, a wrench journaled in said cap for engaging said spool to turn the same, said wrench being so arranged as to be gripped between the end of the handle and the top of the cap upon screwing up the cap when the floss has been wound taut by the wrench.

2. A dental floss holder including a handle, a bow on said handle, means on the handle for holding a spool of dental floss, a fork on the forward end of the bow for securing the forward end of the floss, said fork having an inner knife edge, and means for holding the floss taut across said bow.

3. A dental floss holder including a handle hollow from its rear end, a bow on the forward end of said handle, a spool of dental floss adapted to fit in said hollow handle, said handle having an opening through which the floss on said spool extends, means for securing the forward end of the floss across said bow, means for turning the spool to draw the floss taut and means for holding the spool against turning to hold the floss taut.

4. A dental floss holder including a handle hollow from its rear end, a bow on the forward end of said handle, said handle being provided with a slot extending from its rear end, a spool of dental floss adapted to fit in said hollow handle and the floss being adapted to extend through said slot, to the forward end of said bow, means for securing the forward end of the floss to the forward end of the bow, means for turning the spool to draw the floss taut across the bow, and means for holding the spool against turning to hold the floss taut.

In testimony whereof I affix my signature.

THOMAS W. COOK.